(12) United States Patent
Lee

(10) Patent No.: US 6,269,133 B1
(45) Date of Patent: *Jul. 31, 2001

(54) CO-CHANNEL INTERFERENCE CANCELER AND DRIVING METHOD THEREFOR

(75) Inventor: Myeong-hwan Lee, Suwon (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 09/078,716

(22) Filed: May 14, 1998

(30) Foreign Application Priority Data

Jun. 26, 1997 (KR) .................................................. 97-27612

(51) Int. Cl.⁷ ............................... H04B 1/10; H04N 5/38
(52) U.S. Cl. ............................................. 375/350; 348/21
(58) Field of Search .................................... 375/350, 346, 375/227, 349; 348/21, 470, 558, 555, 607, 609, 614

(56) References Cited

U.S. PATENT DOCUMENTS

| | | | |
|---|---|---|---|
| 5,325,188 | * 6/1994 | Scarpa | 348/624 |
| 5,546,132 | 8/1996 | Kim et al. | 348/607 |
| 5,594,496 | * 1/1997 | Nielsen et al. | 348/21 |
| 5,602,602 | * 2/1997 | Hulyalkar | 348/607 |
| 5,778,139 | * 7/1998 | Kim | 386/81 |
| 5,793,417 | * 8/1998 | Lee | 348/21 |
| 5,798,803 | * 8/1998 | Limberg | 348/726 |
| 6,133,942 | * 10/2000 | Lee | 348/21 |

\* cited by examiner

*Primary Examiner*—Chi Pham
*Assistant Examiner*—Khai Tran
(74) *Attorney, Agent, or Firm*—Sughrue, Mion, Zinn, Macpeak & Seas, PLLC

(57) ABSTRACT

A co-channel interference canceler and a method thereof. The co-channel interference canceler comprises: a co-channel interference rejection filter for outputting a second signal by performing co-channel interference rejection filtering on a first signal including co-channel interference; a selection signal generator for generating a selection signal which selects the signal with less error by calculating the error of each of the first and second signals with respect to a reference signal; a selection corrector for outputting a corrected selection signal by correcting the selection signal such that a predetermined one of the first and second signals is selected in a predetermined error region; and a selector for selecting one of the first and second signals according to the corrected selection signal. Therefore, unlike the selection signal whose state is easily changed even when the channel condition changes only slightly, the selection signal for driving the NRF is maintained in a predetermined error region to select a predetermined path, thereby improving stability and performance of the system.

14 Claims, 6 Drawing Sheets

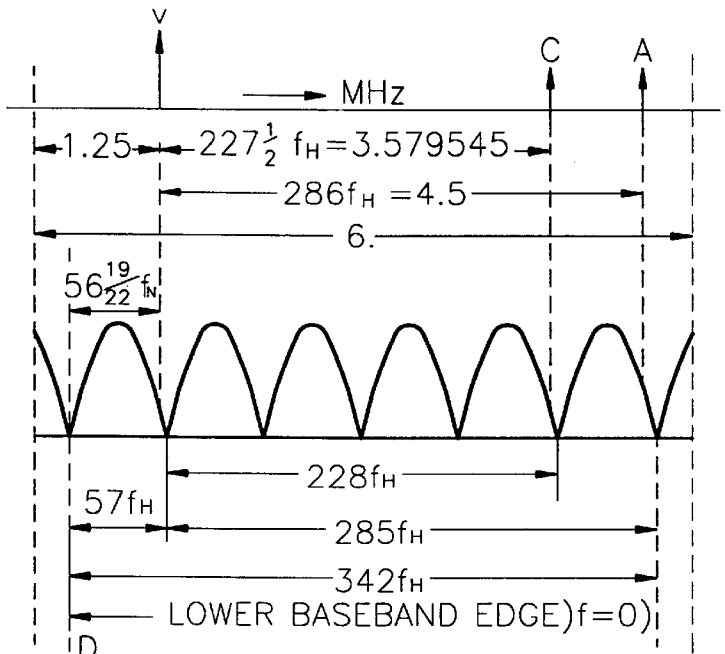
FIG. 2A (PRIOR ART)
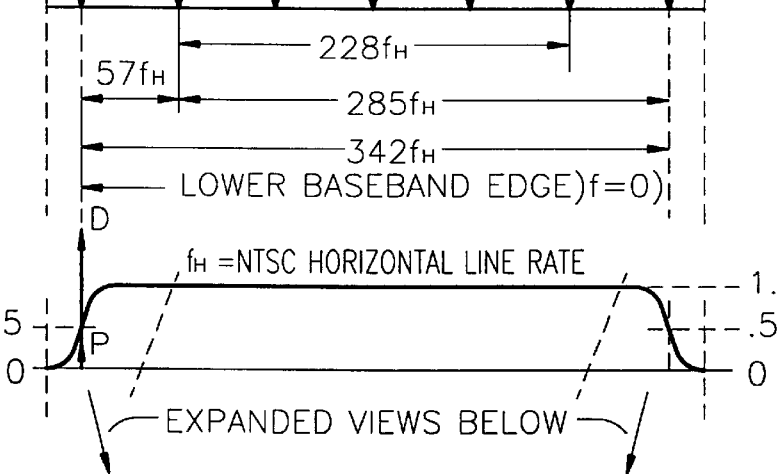
FIG. 2B (PRIOR ART)
FIG. 2C (PRIOR ART)
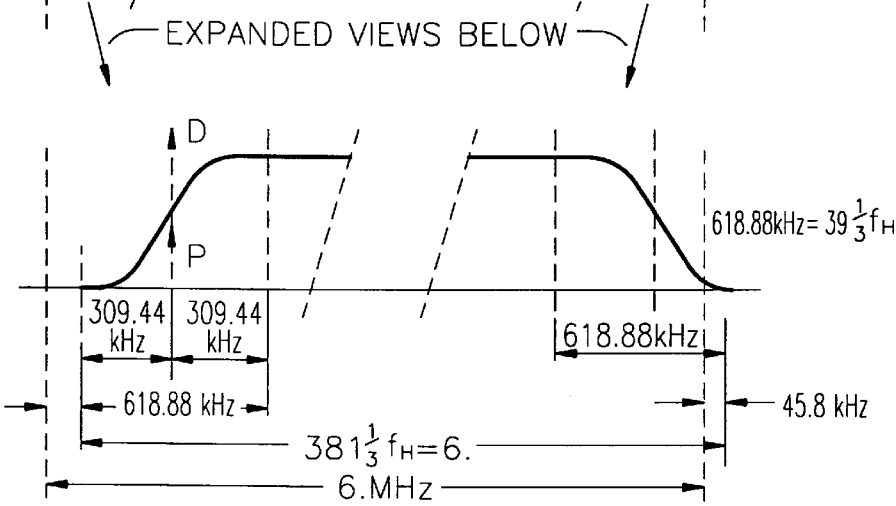
FIG. 2D (PRIOR ART)

CO-CHANNEL INTERFERENCE CANCELER AND DRIVING METHOD THEREFOR

BACKGROUND OF THE INVENTION

1. Field of the Invention

The present invention relates to a system and method for cancelling co-channel interference, specifically for a high definition television (HDTV) receiver.

2. Description of the Related Art

Grand Alliance-Advanced Television (GA-ATV) is a new digital television transmission system standard that is an improvement over the NTSC (National Television System Committee) standard. GA-ATV is intended to replace NTSC. The GA-ATV system (also called "GA-HDTV" or "GA-VSB" system) uses a standard adopted by the Advanced Television System Committee (ATSC). It uses a vestigial side band (VSB) modulation method as a digital transmission method.

In such a system, new ATV signals are usually transmitted along with a conventional analog television signal (NTSC signal) through a television channel that is not used in a given geographic region. Therefore, a GA-ATV receiver must be designed to avoid co-channel interference from the NTSC signal. In order to accomplish this, when the HDTV signal and the NTSC signal are simultaneously broadcast on the same channel, a carrier portion that contains most of the NTSC signal energy is removed.

One of the conventional ways to remove the carrier portion is using a comb filter. A conventional co-channel interference canceler having a comb filter is shown in FIG. 1. The frequency characteristics of such a comb filter is shown in FIG. 2. See *"Guide to the use of the digital television standard for HDTV transmission"*, pp.104~107, Doc.A/54, submitted to the United State Advanced Television System Committee, Apr. 12, 1995.

The conventional co-channel interference canceler of FIG.1 consists of a co-channel interference rejection filter 110 (called "an NTSC interference rejection filter" or "NRF") comprising a comb filter, a selection signal generator and a selector (MUX) 130. The selection signal generator includes the circuit elements 120–129. 120 is a subtractor and 129 is a minimum energy detector.

A second subtractor 112, which is part of the NRF 110, subtracts symbols delayed by a 12-symbol delay (12D) 111 from an input signal. "I channel" data symbols that are received by the system constitute the input signal. Using this process, NTSC modulation carrier component is removed. In such a process, the NTSC component is removed by using a comb filter having a 12-symbol delay.

The selection signal generator determines whether an NTSC signal exists in the HDTV signal by comparing a previously stored field synchronization ("sync") reference pattern with field sync patterns of the received data symbols. The determination is made using the accumulation (energy) of the square of the difference between two compared values. Such an accumulation corresponds to the energy of the error.

The selection signal generator includes a first path corresponding to blocks 120 and 122, a second path corresponding to blocks 123–128, and a minimum energy detector 129. In the first path corresponding to the blocks 120 and 122, the stored reference signal (field sync reference pattern) is compared with a known input signal (field sync) which has not passed through comb filters 110 and 123. Then the energy that is the sum of the squares of the difference is calculated.

In the second path corresponding to blocks 123–128, the input field sync filtered by the comb filter 110 is compared with the field sync reference pattern filtered by the comb filter 123. Then the energy that is sum of the squares of the difference is calculated. The minimum energy detector 129 selects the path having less energy by comparing values of the two paths, and outputs a selection signal NRF_sel that determines whether the NTSC signal exists. That is, if the NTSC signal exists, the energy of the second path via the comb filters 110 and 123 is less. Otherwise, the energy of the first path without passing through the comb filters 110 and 123 is less.

The selection signal NRF_sel is logic "1" when the NTSC signal exists, and logic "0" otherwise. The selector 130 selects either the input data symbols or the data symbol having passed through the comb filter 110, based on the selection signal NRF_sel.

It should be noted that such a comb filter has six frequency nulls, as shown in FIG. 2B, for a 6 MHz HDTV signal band shown in FIG. 2A. Most of the energy of the NTSC signal interfering with the HDTV signal is concentrated on three carriers; a visual carrier, a chrominance sub-carrier and an aural carrier. However, such carriers are located near the frequency notches of the comb filter. Thus, the energy of the NTSC signal passing through the comb filter is considerably reduced. FIGS. 2C and 2D show band edges over various channels in detail.

The comb filter according to the ATSC standards gives good performance while removing interfering NTSC signals. However, since the comb filter subtracts two signals with full gain, additive white Gaussian noise (AWGN) is increased by 3 dB. This causes a loss of signal-to-noise ratio (SNR) of 3 dB while passing through the comb filter. Further, the 8-level input signal increases to 15 levels due to the comb filter.

Thus, the conventional co-channel interference canceler of FIG. 1 compares the energy of the two paths, one before and one after the signal passes through the NRF, and then selects the path with less energy. The NRF is sensitive to minor changes in the channel characteristics.

However, most receivers using digital transmission comprise an error correction decoder. Because of this, the output is different only if the error is above a predetermined level. Therefore, it does not matter which path is selected when the error is below a predetermined level. In addition, frequent changes in the selected path may have detrimental effects on the output performance.

Since NRF is a comb filter, it increases the number of output levels of the signal from 8 levels to 15 levels. Thus the signal state at the subsequent processing unit is changed because the signal passes through the NRF. Frequent minor changes in the input will lead to errors. Thus, the NRF must operate only when co-channel interference exists. Therefore to keep optimal performance of the system, the current channel has to be maintained if the error is below a predetermined level. This will prohibit frequent changes in the level.

U.S. Pat. No. 5,546,132 discloses an NTSC interference detector using received data over all periods instead of just a data field sync reference pattern. U.S. Pat. No. 5,594,496 discloses a detector for canceling NTSC co-channel interference. In '496 a received signal, that includes field syncs of successive fields, is comb filtered to generate a substraction signal. The interference is removed by comparing a comb filtered subtraction signal and a non-filtered subtraction signal. U.S. Pat. No. 5,602,583 discloses an NTSC rejection filter with a switched Tomlinson precoder for reducing the NTSC co-channel interference in ATV receivers. U.S. Pat. No. 5,325,188 discloses an NTSC signal interference canceler using digital recursive notch filters.

SUMMARY OF THE INVENTION

It is an object of the present invention to provide a co-channel interference canceler for stably canceling co-channel interference.

It is another object of the present invention to provide a co-channel interference canceler capable of stably maintaining a selection signal that controls the selection of a co-channel interference rejection filter.

It is still another object of the present invention to provide a method for stably canceling co-channel interference signal.

It is yet still another object of the present invention to provide a method for stably maintaining a selection signal that controls the selection of a co-channel interference rejection filter.

To achieve the first and second objects, there is provided a co-channel interference canceler comprising: a co-channel interference rejection filter for performing co-channel interference rejection filtering on a first signal having co-channel interference and outputting a second signal; a selection signal generator for generating a selection signal, said generator calculating a first error corresponding to said first signal and a second error corresponding to said second signal, said first error and second error being based on a reference signal, said selection signal being one of the first and second signal having a lesser error; a selection corrector for correcting the selection signal and outputting a corrected selection signal such that a predetermined one of the first and second signals is selected when the first error and the second error is within a predetermined range; and a selector for selecting one of the first and second signals based on the corrected selection signal.

To achieve the third and fourth objects, there is provided a method for cancelling co-channel interference in a co-channel interference canceler canceler comprising: outputting a second signal by performing co-channel interference rejection filtering on a first signal having co-channel interference; generating a selection signal based on errors of the first and second signals; outputting a corrected selection signal by correcting the selection signal such that a predetermined one of the first and second signals is selected when said errors are in a predetermined range; and selecting one of the first and second signals based on the corrected selection signal.

BRIEF DESCRIPTION OF THE DRAWINGS

The above objects and advantages of the present invention will become more apparent by describing in detail preferred embodiments thereof with reference to the attached drawings in which:

FIGS. 2A–2D show frequency characteristics of a comb filter alongside an NTSC carrier;

DESCRIPTION OF THE PREFERRED EMBODIMENTS

Figure 1:
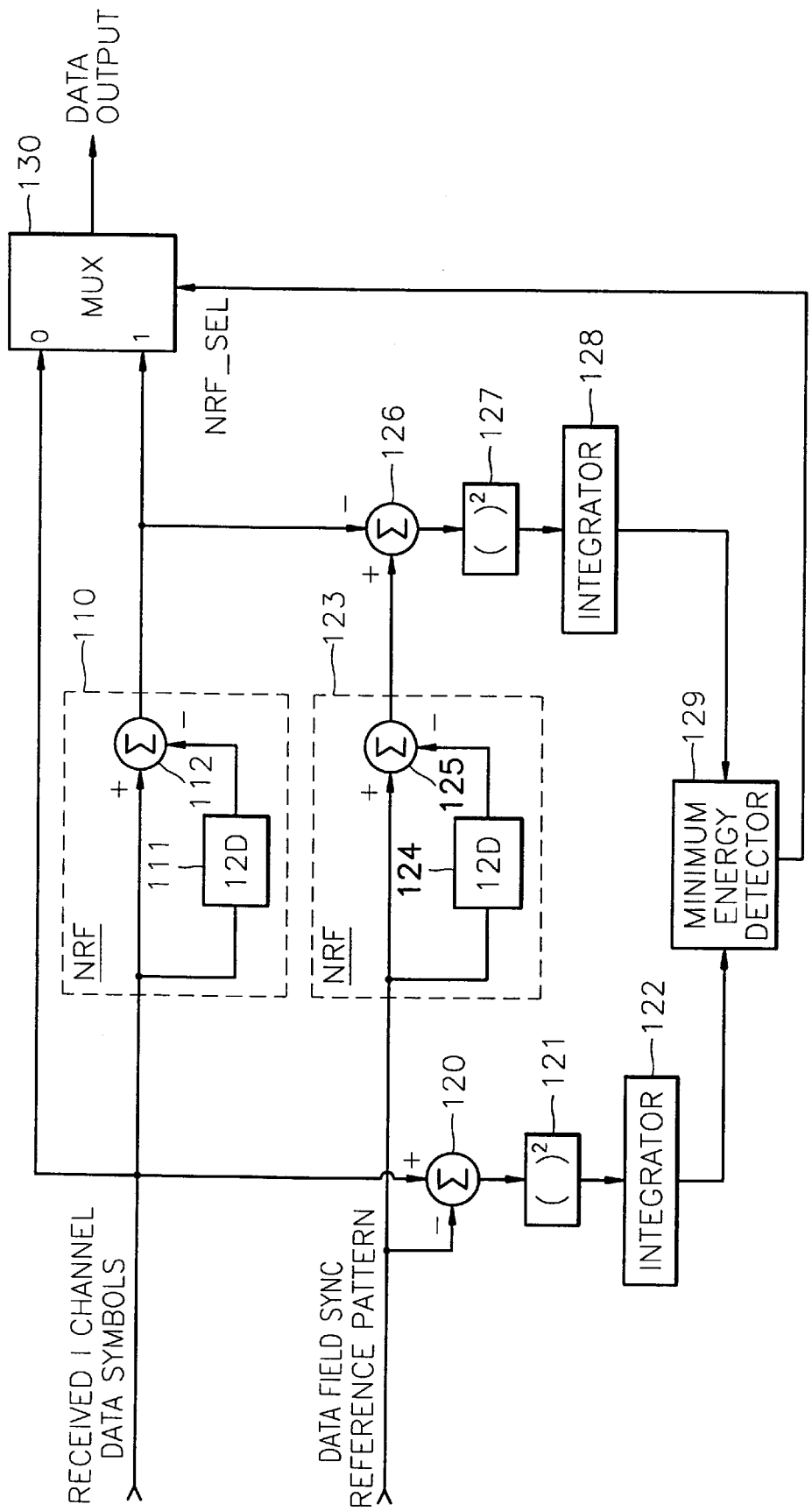
FIG. 1 is a block diagram of a conventional co-channel interference canceler.
Figure 3:
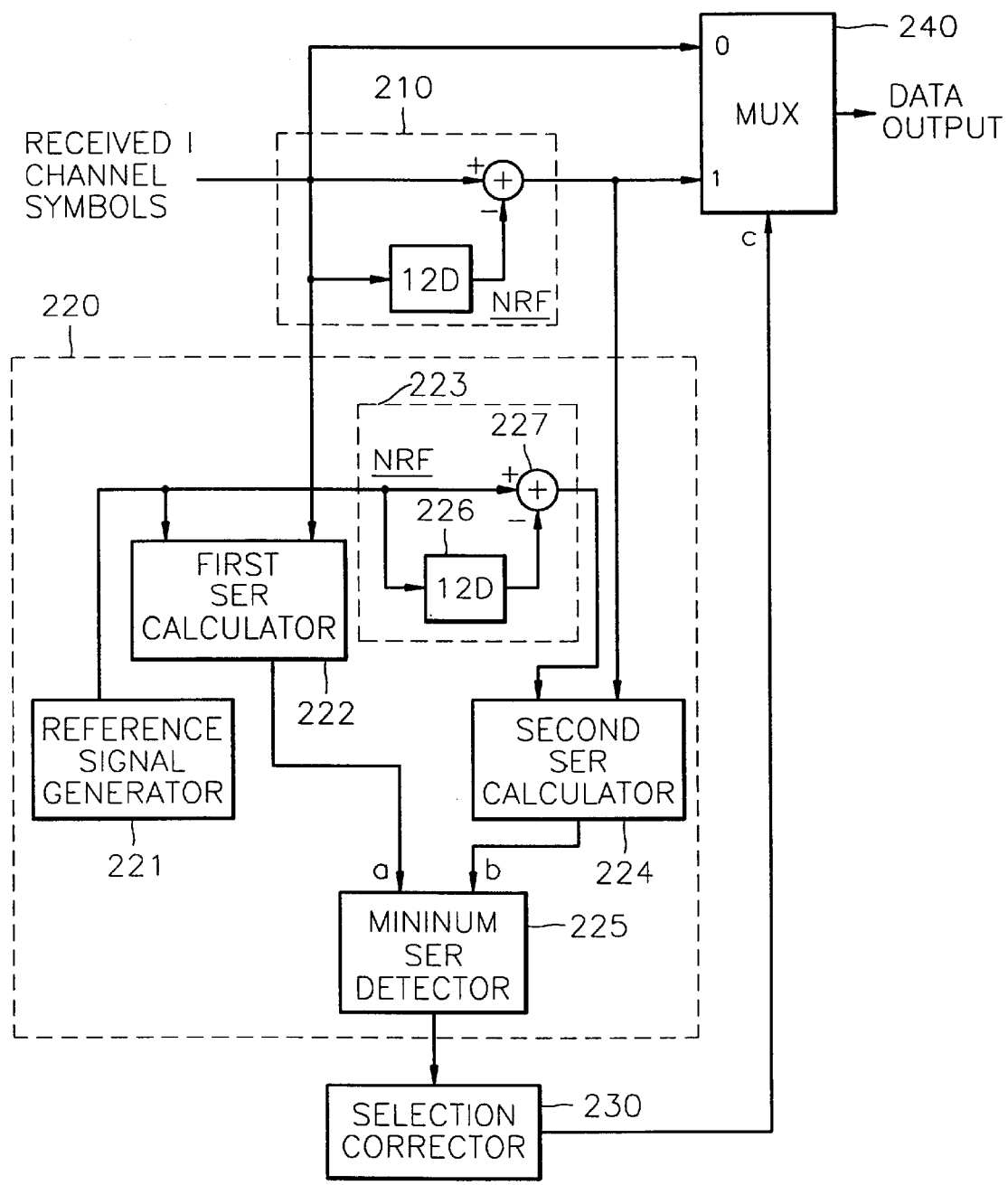
FIG. 3 is a block diagram of a co-channel interference canceler according to a preferred embodiment of the present invention.

In FIG. 3, a co-channel interference canceler according to the present invention is shown. It comprises an NTSC interference rejection filter (NRF) 210 for rejecting co-channel interference from a received in-phase (I) channel symbol data, a selection signal generator 220, a selection corrector 230 and a selector 240. In the first path, a symbol error rate (SER) between an input reference signal and a previously stored reference signal is calculated. In the second path, an SER between the reference signal of the input data symbols that has passed through the NRF 210 and the reference signal that has passed through an NRF 223 is calculated.

The selection signal generator 220 generates a selection signal that selects the path with the least SER, by comparing the first path with the second path. The selection corrector 230 corrects the selection signal such that the path selected by the selection signal generator 220 is not changed when the errors are in a predetermined range. Finally, the selector 240 selects the input symbol data or the data symbol passed through the NRF 210 according to a corrected selection signal c⁻ output from the selection corrector 230.

In this preferred embodiment, a reference signal generator 221 of the selection signal generator 220 generates a field sync reference pattern for a predetermined period. The predetermined period may be equal to a field sync segment period of a vestigial side band (VSB) signal, or a pseudo number (PN) of a period within the field sync segment period. A first SER calculator 222 calculates the SER between a field sync of the input signal and a field sync reference pattern that is a reference signal generated by the reference signal generator 221 for the predetermined period. The SER may be calculated by counting the number of error symbols.

An NRF 223 filters the field sync reference pattern generated by the reference signal generator 221. A second SER calculator 224 calculates an SER between the input field sync filtered by the NRF 210 and the data field sync reference pattern filtered by the NRF 223. The minimum SER detector 225, which may be a comparator, compares the SER(a) calculated by the first SER calculator 222 with the SER(b) calculated by the second SER calculator 224, and generates a selection signal for selecting the path with less SER. Here, the first SER calculator 222 is located in the first path, and the NRF 223 and the second SER calculator 224 is located in the second path.

Several advantages of the present invention should be noted. The selection signal according to the present invention is determined using the SER between the input signal and the reference signal. The selection signal according to the conventional method is determined using the energy of the error between the input signal and the reference signal. Because of this, in the conventional NRF, a squaring unit is required for calculating the energy of error. The squaring unit introduces additional hardware that is complicated. It also makes the decision less reliable.

The increased reliability of the present invention is because the actual error rate is the basis for deciding the output rather than the accumulated energy of the error.

Also, the selection signal generator of the present invention may use any method such as MSE and SER to calculate errors of each path. In the preferred embodiment of the present invention, the NRFs 210 and 223 are comb filters. However, any type of co-channel interference rejection filter, including a finite impulse response (FIR) filter and a notch filter disclosed in U.S. Pat. No. 5,325,188, can be used.

In addition, according to the present invention, a selection corrector 230 is connected to the output of the selection signal generator 220 so that the path is maintained if the error is within a predetermined range. This prevents the degradation of performance by frequent changes in the path.

Figure 4:
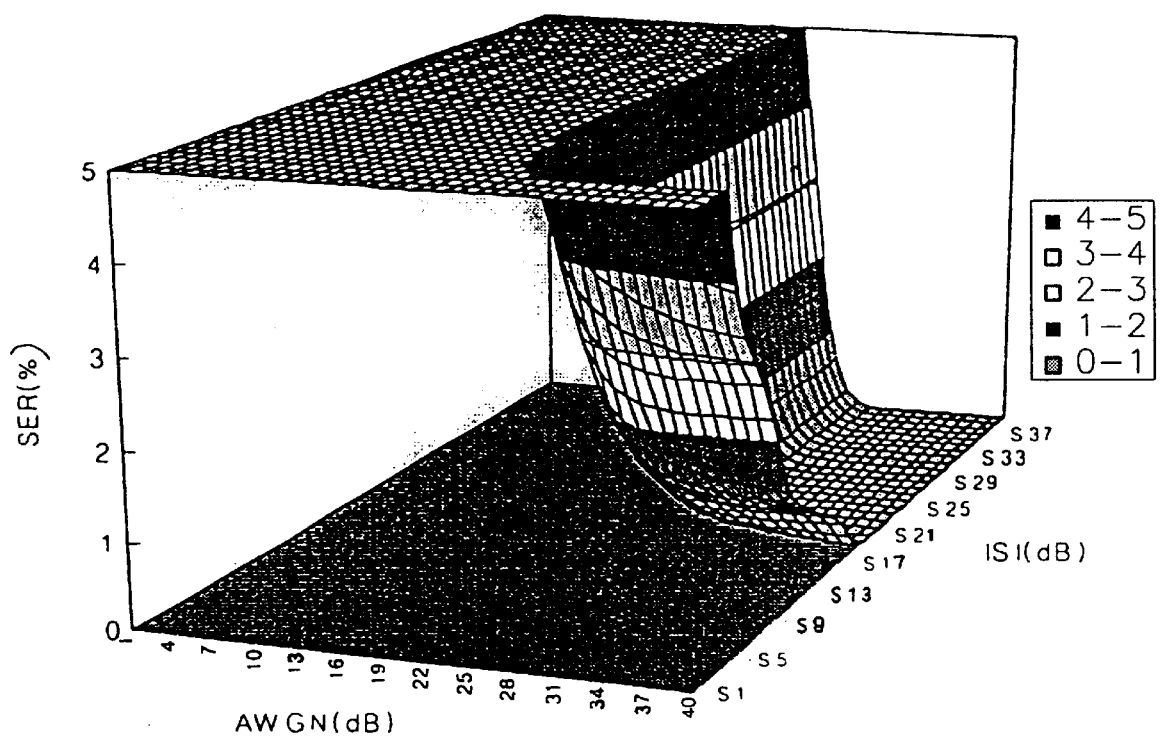
FIG. 4 is a diagram showing the change of a symbol error rate (SER) according to inter-symbol interference (ISI) and additive white Gaussian noise (AWGN) of a signal that has passed through the NRF of FIG. 3.
Figure 5:
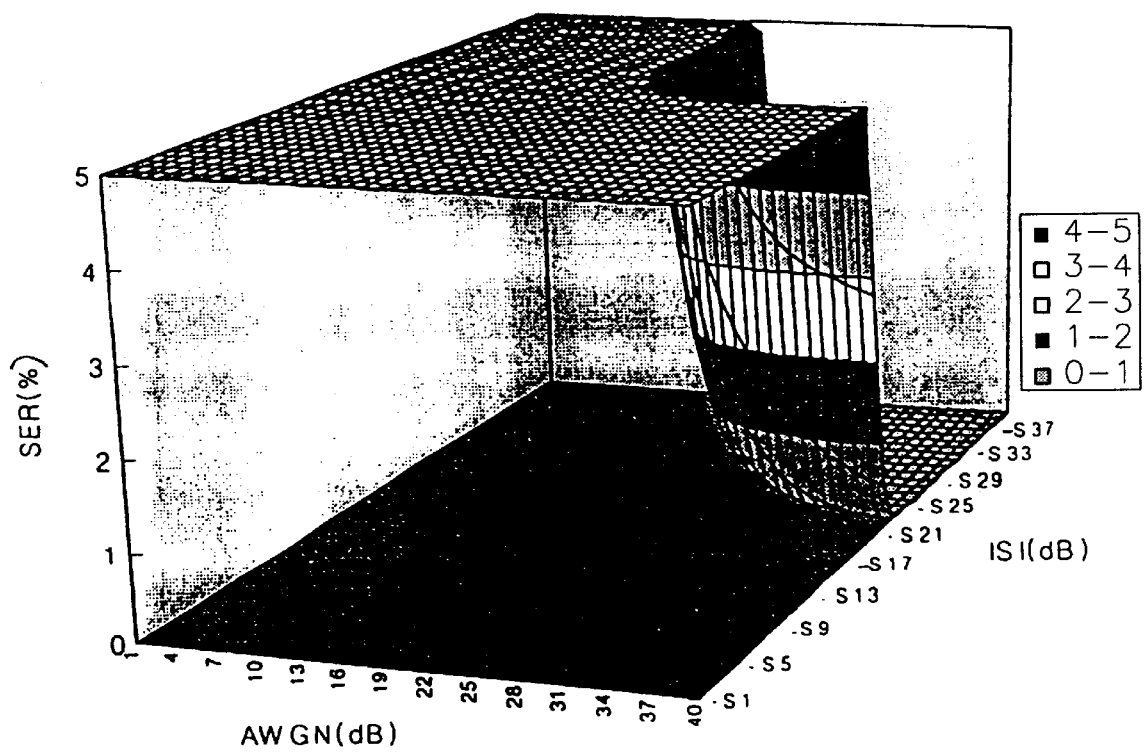
FIG. 5 is a diagram showing the change of the SER according to the ISI and AWGN of a signal that has not passed through the NRF of FIG. 3.

To help understand the present invention, FIG. 4 shows the SER of a 15-level signal after passing through the NRF using the AWGN and the ISI (co-channel interference signal). FIG. 5 shows the SER of an 8-level signal before passing through the NRF using the AWGN and the ISI.

Figure 6:
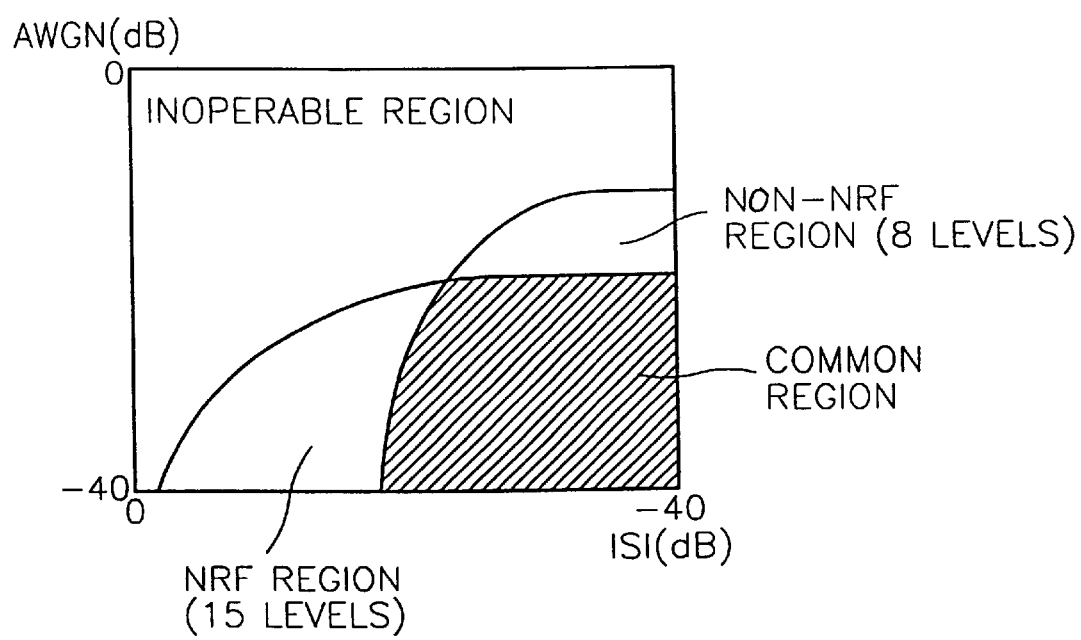
FIG. 6 is a diagram showing the operational regions relating to the NRF according to the ISI and the AWGN.

After correcting an error that is lower than about 5% (SER<5%), a 2-dimensional diagram can be obtained as shown in FIG. 6. It shows an NRF-region filtered by the NRF (15 levels), a non-NRF region (8 levels), an inoperable region and a common region in which both the paths are operable. In the common region, it does not matter which path is selected. Since frequent changes of a path reduces the performance of the receiver, it is preferable that the path is not changed when the error is in the common region.

Figure 7:
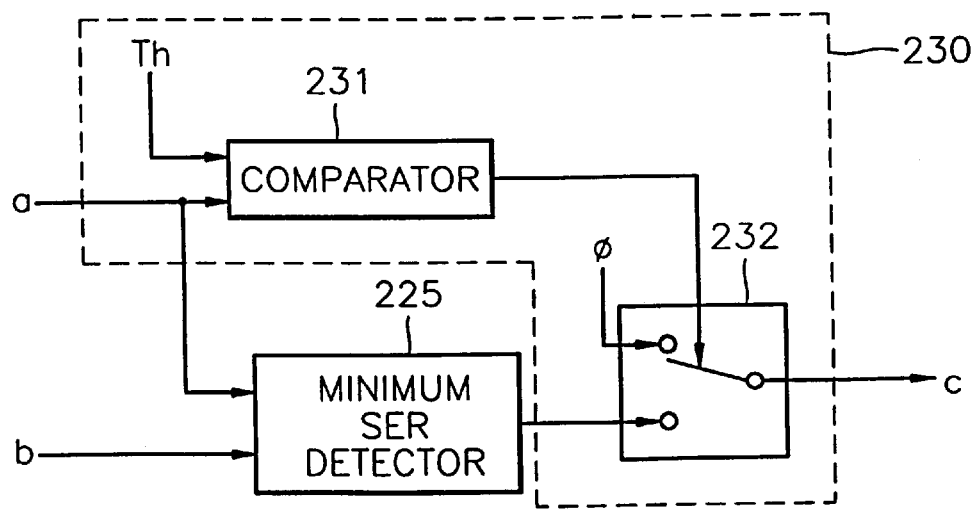
FIG. 7 is a detailed block diagram of a selection corrector of FIG. 3.

FIG. 7 shows a preferred embodiment that maintains the preexisting path selection if the error is within the common region. The selection corrector 230 of the preferred embodiment, shown in FIG. 7, maintains the preexisting path selection when the error corresponding to the preexisting path is in the common region in which either path is operable. This keeps a stable signal state.

In FIG. 7, the two paths have error rates "a" and "b", respectively. A comparator 231 compares the error rate "a" of the reference path (here, non-NRF path) with a threshold value Th. If the error rate "a" is less than the threshold value Th, a selection switch 232 selects control value "0" corresponding to the reference path, thereby keeping the preexisting path. Otherwise, the selection switch 232 bypasses the selection signal output from the minimum SER detector 225.

Here, "a" and "b" are called the symbol error rates of the paths before and after passing through the NRF, respectively. However, the symbol error rates are not fixed as above. If the reference path is set to the NRF-path, the symbol error rate input to the comparator 231 may be "b". Also, the threshold value Th is set to a predetermined SER corresponding to the common region of FIG. 6. Also, the above selection switch 232 is only an example. The selection switch may be a multiplexer or a logic circuit in a real circuit.

CONCLUSION

The conventional NRF selection control method for canceling the co-channel interference signal changes the logic value of the selection signal according to the result of the comparison between errors of each path even when the same channel condition does not change, thus the selection of the NRF changes frequently. However, according to the present invention, the selection corrector 230 of FIG. 7 fixes the predetermined path in a predetermined error region, keeping a stable signal state.

Unlike the conventional circuit where the state of the selection signal for controlling the selection of the NRF is easily changed even when the channel condition changes only slightly, according to the present invention, a predetermined path is selected and maintained in a predetermined error region, thereby improving stability and performance of the system.

Also, in the present invention, the co-channel interference rejection filter is selected based on the SER, thereby resulting in better performance in decision performed at the output of the co-channel interference canceler.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A co-channel interference cancelling system comprising:

a co-channel interference rejection filter for performing co-channel interference rejection filtering on a first signal having co-channel interference and outputting a second signal;

a selection signal generator for generating a selection signal, said selection signal generator calculating a first error corresponding to said first signal and a second error corresponding to said second signal, said first error and second error being based on a reference signal, said selection signal being one of the first signal and second signal having a lesser error;

a selection corrector for correcting the selection signal and outputting a corrected selection signal such that a predetermined one of the first signal and the second signal is selected when the first error and the second error is within a predetermined range; and a selector for selecting one of the first signal and second signal based on the corrected selection signal.

2. The co-channel interference canceler of claim 1, wherein the first error is a symbol error rate of said first signal based on the reference signal and second error is a symbol error rate of said second signal based on the reference signal.

3. The co-channel interference canceler of claim 1, wherein the selection signal generator generates the selection signal that causes the outputting of one of the first signal and second signal with less energy, said energy being calculated with respect to the reference signal.

4. The co-channel interference canceler of claim 1, wherein the selection corrector comprises:

a comparator for comparing one of the first error and second error; and a selection unit for outputting a corrected selection signal which cause the selection of one of the first signal and the second signal if error corresponding to said one of the first error and the second error is less than a preselected threshold value, and bypassing the selection signal if error corresponding to said one of the first and the second error is more than a preselected threshold value.

5. A co-channel interference canceler having a selection signal generator for generating a selection signal which selects a path with less error corresponding to one of a first path which does not pass through an NTSC interference rejection filter (NRF) and a second path which passes through the NRF to control the selection of the NRF, wherein the selection signal generator comprises:

a comparator for comparing an error corresponding to one of the first and second paths with a threshold value; and a selector for outputting a corrected selection signal for causing the selection of one of the first path and the second path if the error of said one of the first path and the second path is less than a threshold value, and bypassing the selection signal if the error of said one of the first path and the second path is greater than a threshold value.

6. The co-channel interference canceler of claim 5, wherein the first error is a symbol error rate of said first path based on a reference signal and second error is a symbol error rate of said second path based on the reference signal.

7. The co-channel interference canceler of claim 5, wherein the selection signal generator generates the selection signal which causes the selection of one of the first path and the second path with lower mean square error (MSE), wherein the MSE of a predetermined signal of each of the first path and the second path is calculated with respect to the reference signal.

8. A method of canceling interference for a co-channel interference canceler, said method comprising:

(a) outputting a second signal by performing co-channel interference rejection filtering on a first signal having co-channel interference;

(b) generating a selection signal based on errors of the first signal and the second signal;

(c) outputting a corrected selection signal by correcting the selection signal such that a predetermined one of the first signal and the second signal is selected when said errors are in a predetermined range; and (d) selecting one of the first signal and the second signal based on the corrected selection signal.

9. The method of claim 8, wherein said errors are symbol error rates corresponding to the first signal and the second signal based on the reference signal.

10. The method of claim 8, wherein the selection signal is generated that causes the selection of one of the first signal and the second signal with less energy, said energy being calculated with respect to a reference signal.

11. The method of claim 8, wherein step (c) comprises:

(c1) comparing error of one of the first signal and the second signal, calculated in the step (b), with a predetermined threshold value; and (c2) outputting the corrected selection signal which causes the selection of one of the first signal and the second signal if the error of said one of the first signal and the second signal is less than a threshold value, and bypassing the selection signal if the error of said one of the first signal and the second signal is less than a threshold value.

12. A method of of canceling interference for a co-channel interference canceler, said method comprising:

(a) generating a selection signal which selects a path with less error, said path being one of a first path which does not pass through an NTSC interference rejection filter (NRF) and a second path which passes through the NRF;

(b) comparing the error of said one of the first path and the second path with a threshold value; and (c) outputting a corrected selection signal that selects said one of the first path and the second path if the error of said one of the first path and the second path is less than a threshold value, and bypassing the selection signal if the error of said one of the first path and the second path is less than a threshold value.

13. The method of claim 12, wherein the selection signal is generated by calculating the symbol error rate of a predetermined one of the first signal and the second signal with respect to the reference signal.

14. The method of claim 12, wherein the selection signal for selecting a path with less mean square error (MSE) is generated by calculating the MSE of a predetermined one of the first signal and the second signal with respect to the reference signal.

* * * * *